Dec. 1, 1959     W. R. MACLAY     2,914,956
SPRING DRIVE APPARATUS
Filed Nov. 1, 1957     2 Sheets-Sheet 1

*INVENTOR.*
WILLIAM R. MACLAY
BY
*Dewey J. Cunningham*
ATTORNEY

Dec. 1, 1959   W. R. MACLAY   2,914,956
SPRING DRIVE APPARATUS
Filed Nov. 1, 1957   2 Sheets-Sheet 2
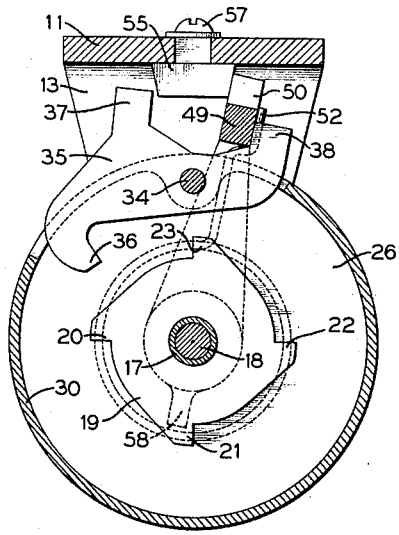
FIG_2
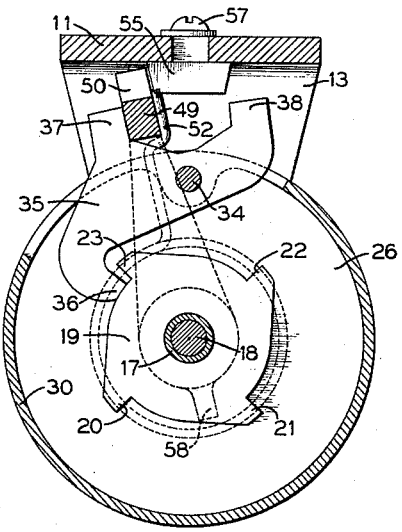
FIG_3
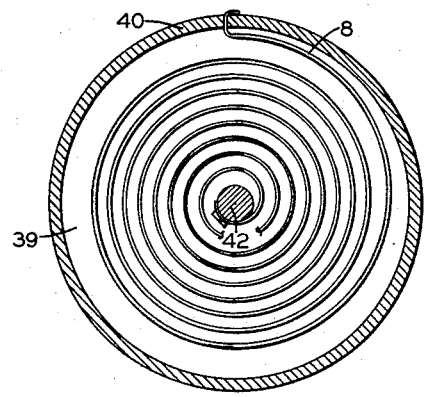
FIG_5
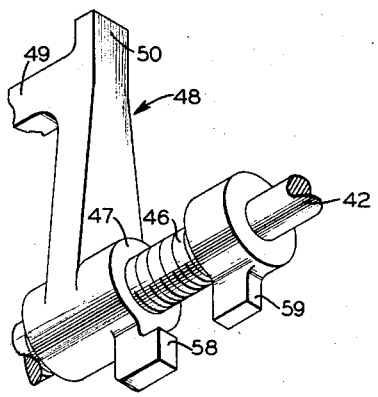
FIG_4

_United States Patent Office_

2,914,956
Patented Dec. 1, 1959

2,914,956

SPRING DRIVE APPARATUS

William R. Maclay, Endicott, N.Y., assignor to International Business Machines Corporation, New York, N.Y., a corporation of New York Application November 1, 1957, Serial No. 693,881

4 Claims. (Cl. 74—125.5)

This invention relates to spring drive apparatus, and particularly to an arrangement whereby an output shaft has a substantially constant torque available for variable or intermittent use.

There are a number of different types of spring drive apparatus available for supplying a shaft output on either a continuous or intermittent basis. In certain types of clock drives, for example, a winding mechanism is periodically operated to wind a spring to produce a torque which is available at an output shaft. A disadvantage of this arrangement is that the torque available to do work is non-linear in nature from the time the spring is completely wound until the time it is ready to be rewound. This non-linearity is a detriment in many applications for spring drive apparatus.

In contrast to the above type of arrangement, the present invention utilizes a continuously running input shaft which is intermittently connected to wind the spring only when it is necessary to do so in order to provide a substantially constant torque available on an output shaft which may be intermittently operated at and for variable intervals of time.

The prime object of the present invention is to furnish a new improved spring drive or spring motor arrangement for providing a substantially constant torque available at an output shaft.

Another object of the invention is to furnish a new and improved spring drive arrangement wherein a continuously running input shaft is automatically coupled to wind the spring utilized in said drive arrangement in order to maintain a substantially constant torque at an output shaft.

Still another object of this invention is to provide a spring drive arrangement as described above in which the shock produced in coupling the continuously running input shaft to wind the spring is absorbed by the spring itself.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 2 is a sectional view taken on lines 2—2 of Fig. 1;

Fig. 3 is a view similar to Fig. 2 except that in Fig. 3 the input shaft is coupled to wind the spring.

Fig. 4 is an isometric view of the traveling nut which is utilized in the present invention; and Fig. 5 is a view taken on line 5—5 of Fig. 1.

Figure 1:
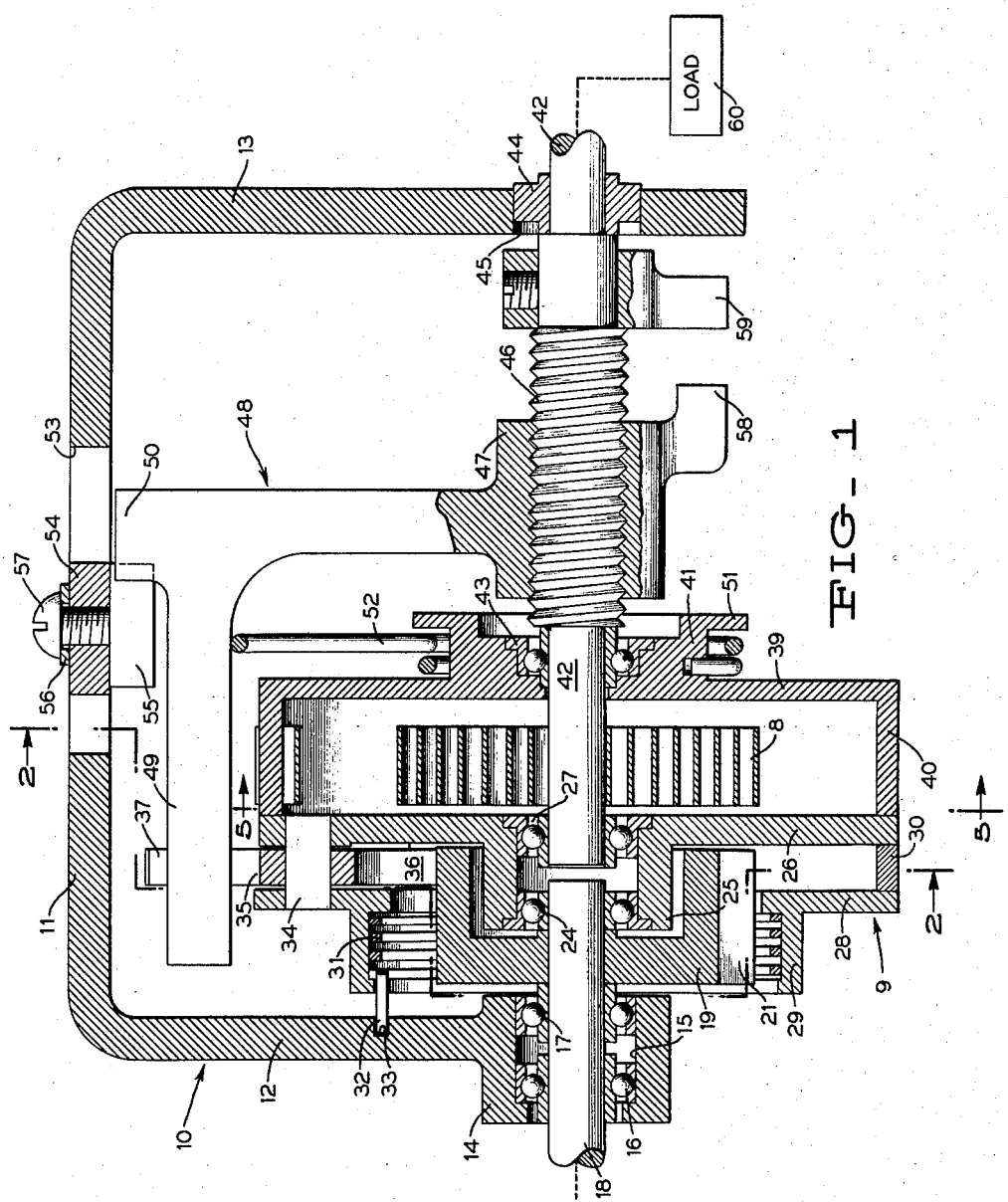
Fig. 1 is a cross-sectional view of the present invention.

Briefly, there is provided an inverted U-shaped frame member in which an input and an output shaft are journalled. A housing is journalled on the two shafts, there being provided a spiral spring having one end connected to said output shaft and the other end connected to said housing. A pawl or dog is pivotally mounted on said housing and is adapted to engage a toothed wheel on said continuously rotating shaft when the spring is to be wound and to disengage said toothed wheel when the spring is wound. Control over the pawl is exercised by an arm which is threadingly received on the output shaft. After the spring has been wound, the arm moves axially of the output shaft as the shaft rotates and is caused to be displaced from a stop member and urged to strike the pawl to cause it to engage the toothed wheel on the continuously rotating shaft. Thus, the housing becomes connected to the input shaft and is rotated thereby, thus winding the spiral spring. The arm rotates with the housing during the winding operation so that it moves axially of the output shaft in a direction to return to the stop member. When it reaches the stop member, it ceases rotation and in so doing causes the pawl to be disengaged from the toothed wheel on the input shaft. Thus, the spring is returned to a wound position.

For a more detailed description, reference is made to Figs. 1 through 5. A frame member, which in the present instance is illustrated as an inverted U-shaped member provided with reference numeral 10, has a top portion 11 and, as shown in Fig. 1, a left side 12 and a right side 13. At the lower end of the left side of the frame, there is formed a hub 14 which is apertured as at 15 to receive bearings 16 and 17. These bearings serve to journal the input shaft 18 in the hub, said input shaft being driven by a suitable motor (not shown). A wheel 19 is fixed to the input shaft, said wheel being provided with teeth 20, 21, 22 and 23.

A bearing 24 is secured to the one end of the input shaft 18 and a bearing 27 is secured to one end of the output shaft 42. Tub 25, which is formed on one side of a disc 26, is journalled on the input and output shafts by way of the aforementioned bearings 24 and 27. Disc 26 and hub 25 are a part of the housing for the storage spring which will be described at a latter time. A disc 28 is mounted in spaced relation from disc 26 by means of the spacer member 30 which, as shown in Fig. 2, extends for approximately 270° along the periphery of discs 28 and 26. These last-mentioned discs may be secured in a suitable manner, as by welding, to spacer 30.

A sleeve 29 is formed on one side of disc 28, said sleeve being utilized to house a torsion spring 31. Spring 31 has one end, designated by reference numeral 32, which extends perpendicular thereto so as to be received by an aperture 33 in the left side frame member. Spring 31 is of the type commonly used in one-way helical spring brakes which allow rotation of a member in one direction but not in the other. Thus, when an effort is made to rotate sleeve 29 in a direction which tends to wind the spring 31, i.e. to decrease the diameter thereof, the sleeve is allowed to rotate. However, when an attempt is made to rotate the sleeve in the opposite direction, the spring tends to unwind. This makes the spring tend to increase in diameter and prevents the sleeve from rotating. Thus, spring 31 allows sleeve 29, as well as the discs 26 and 28 with which it is fixed, to rotate only in one direction.

Discs 26 and 28 are apertured to receive a pivot pin 34, said pivot pin being utilized to journal a pawl 35. As shown in Figs. 2 and 3, the pawl has the tooth 36 formed thereon, said tooth being adapted to engage one of the teeth 20 through 23 on wheel 19 during the windings of the storage spring which drives the output shaft. The pawl has ears 37 and 38 formed in spaced apart relation on the upper side thereof, said ears being utilized for a reason later to be explained.

It has previously been explained that discs 26 and 28 are a part of the housing illustrated generally by reference numeral 9. The remainder of the housing is comprised of a disc 39 having a cylindrical flange 40 formed on one side thereof, said flange being secured in a suitable fashion to disc 26. A storage spring 8, which is illustrated as being in the form of a spiral spring, is adapted to fit within the housing between discs 26 and 39. One end of spring 8 is connected to the output shaft 42 while the other end thereof is connected to the flange 40.

Disc 39 is furnished centrally thereof with a hub illustrated by reference numeral 41, said hub being journalled on the output shaft 42 by a way of a bearing 43. Starting at a point adjacent this bearing, the output shaft is threaded, as at 46, to a point where a stop 59 is secured to the shaft. A bearing 44 is utilized to journal the part of the shaft adjacent said stop in side 13 of the frame member, said bearing 44 being received by an aperture 45 in side 13.

An arm, illustrated generally by reference numeral 48, is journalled on the output shaft, said arm having a hub 47 formed thereon which is tapped to receive the threaded portion 46 of the output shaft. A horizontal extension 49 is formed on arm 48 which is adapted to actuate the pawl 35 by engaging either of the ears 37 or 38 thereon.

A lip 51 is furnished on hub 41 to retain a spring 52 which is wrapped around the hub. One end of the spring is secured to the hub and the other end is adapted to engage the horizontally extending portion 49 of the arm.

Arm 48 also has a projecttion 50 thereon which is adapted to engage a stop member 55 secured to the frame member 10 in a manner now to be described. A slot 53 is provided in the upper portion 11 of the frame member, said slot being adapted to receive a slidable member 54 upon which the stop member 55 is mounted. Slidable member 54 is apertured to receive a screw 57 and is held in place by a washer 56 and stop member 55 when the screw is tightened. It will be apparent that the stop 55 may be adjusted by way of the slidable member in order to control the position at which the arm 48 comes to rest.

The projection 50, in engaging stop 55, limits the movement of arm 48 in one direction, i.e., to the left, as shown in Fig. 1. Movement of the arm to the right is limited by a projection 58 on the lower end of hub 47, this projection being adapted to engage an adjustable stop 59 which is secured to the output shaft in a suitable fashion.

The detailed operation of the invention will now be described. Let it be assumed that the storage spring 8 is in a wound condition, as illustrated in Fig. 1, so that the projection 50 on arm 48 is an engagement with stop member 55 and is urged thereagainst by spring 52. As previously described, spring 31 will prevent rotation of housing 9 in a direction which would allow the storage spring to unwind. Under these circumstances, the horizontally extending portion 49 of arm 48 will be in engagement with the ear 38 of pawl 35 as shown in Fig. 2, and thereby hold the pawl out of engagement with the continuously rotating toothed wheel 19.

Let it now be assumed that a suitable load 60 serves as a shaft control device. For example, an escapement mechanism may be connected to control the rotation of the output shaft 42. The escapement could be in the form of a one revolution clutch. The clutch could be controlled in any convenient manner such as by a magnet. It will be seen that rotation of the output shaft will cause the arm 48 to move toward the right side 13 of the frame member. As this movement progresses, a point will be reached where the projection 50 on arm 48 moves off the stop 55. When this occurs, spring 52 urges the arm 48 in a direction such that the horizontally extending portion 49 of the arm strikes the ear 37 of the pawl 35 and causes the pawl to rotate until tooth 36 of the pawl engages one of the teeth 20 through 23 on the continuously rotating wheel 19. When this occurs, the housing 9 and the arm 48 are clutched to the continuously rotating wheel and rotate therewith. The shock caused by instantaneously clutching a continuously rotating shaft to the output shaft, which may possibly be stopped, is absorbed by the spring 8. That is, since spring 8 is unwound to some extent, the shock will be absorbed by the spring as it is being wound. It is during rotation of the housing that the storage spring 8 is wound. The rotation continues until projection 50 on arm 48 strikes stop 55. As the toothed wheel 19 continues to rotate, ear 38 on the pawl engages the horizontal extending portion 49 of arm 48 and pivots such that tooth 36 comes out of engagement with the toothed wheel 19. Thus, the spring is rewound.

The time duration of the winding operation is dependent on the number of revolutions of the output shaft during the winding. Normally, the output shaft is allowed to rotate faster than the input shaft but the time during which such output shaft rotation occurs is limited so that arm 48 is not moved so far to the right, as shown in Fig. 1, that projection 58 on the laterally moving arm engages stop 59 on the output shaft. In this fashion, a substantially constant torque is available on the output shaft.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Spring drive apparatus comprising frame means having a continuously running input shaft and an output shaft journalled therein for independent rotation, a first rotatable member journalled on said output shaft, means for preventing rotation of said first rotatable member in a direction opposite to the direction of rotation of said input shaft, a storage spring for supplying torque to said output shaft, said spring having one end connected to said output shaft and the other end connected to said first rotatable member, a second rotatable member fixed to said input shaft, actuating means threadingly mounted on said output shaft, and clutching means governed by said actuating means for coupling said first and second rotatable members together after said spring has unwound to a predetermined state and for decoupling said first and second rotatable members after said spring has been wound to a predetermined state.

2. Spring drive apparatus comprising frame means having a continuously running input shaft and an output shaft journalled therein for independent rotation, a first rotatable member journalled on said output shaft, means for preventing rotation of said first rotatable member in a direction opposite to the direction of rotation of said input shaft, a storage spring for supplying torque to said output shaft, said spring having one end connected to said output shaft and the other end connected to said first rotatable member, a second rotatable member fixed to said input shaft, actuating means threadingly mounted on said output shaft, pawl means pivotally mounted on said first rotatable member, said second rotatable member being adapted to be engaged by said pawl means so as to clutch said first and second rotatable members together, said pawl means being governed by said actuating means for coupling said first and second rotatable members together after said spring has unwound to a predetermined state and for decoupling said first and second rotatable members after said spring has been wound to a predetermined state.

3. Spring drive apparatus comprising frame means having a continuously running input shaft and an output shaft journalled therein for independent rotation, a rotatable member journalled on said output shaft, means for preventing rotation of said rotatable member in a direction opposite to the direction of rotation of said input shaft, a storage spring for supplying torque to said output shaft, said spring having one end connected to said rotatable member and the other end connected to said output shaft, ratchet means fixed to said input shaft for rotation therewith, pawl means pivotally mounted on said rotatable member having positions of engagement and disengagement with said ratchet means, actuating means threadingly mounted on said output shaft, means for causing said actuating means to urge said pawl means into engagement with said ratchet means when said spring has unwound to a predetermined degree, and means for engaging said actuating means so as to cause said actuating means to urge said pawl means into its position of disengagement with said ratchet means when said spring is wound.

4. Spring drive apparatus comprising frame means having a continuously running input shaft and an output shaft journalled therein for independent rotation, a first rotatable member journalled on said output shaft, means for preventing rotation of said first rotatable member in a direction opposite to the direction of rotation of said input shaft, a storage spring for supplying torque to said output shaft, said spring having one end connected to said output shaft and the other end connected to said first rotatable member, a second rotatable member fixed to said input shaft, arm means threadingly mounted on said output shaft, a stop on said frame means adapted to be engaged by said arm means when said spring is wound, means for urging said arm means to rotate past said stop when said output shaft has rotated a predetermined amount after said spring is wound, and pawl means mounted on said first rotatable member, said arm means urging said pawl means to engage said second rotatable member after said arm means rotates past said stop so as to clutch said first and second rotatable members together to thereby wind said spring and to rotate said arm means on said output shaft, said arm means urging said pawl means to be disengaged from said second rotatable member when said arm means engages said stop.

References Cited in the file of this patent

UNITED STATES PATENTS

| | | |
|---|---|---|
| 1,776,360 | Joyner | Sept. 23, 1930 |
| 2,326,948 | Imperato | Aug. 17, 1943 |